(12) United States Patent
Ueyama et al.

(10) Patent No.: US 6,565,985 B2
(45) Date of Patent: May 20, 2003

(54) HEAT-SHRINKABLE MULTILAYER FILM (75) Inventors: Takahisa Ueyama, Ibaraki-ken (JP); Tadayoshi Itoh, Ibaraki-ken (JP)

(73) Assignee: Kureha Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,333

(22) Filed: Sep. 26, 2001

(65) Prior Publication Data

US 2002/0061412 A1 May 23, 2002

(30) Foreign Application Priority Data

Sep. 26, 2000 (JP) ........................................ 2000-291655

(51) Int. Cl.$^7$ .............................................. B32B 27/34
(52) U.S. Cl. ................................. 428/474.4; 428/475.2; 428/475.5; 428/347; 428/349; 428/354
(58) Field of Search ................................. 428/343, 346, 428/347, 349, 354, 474.4, 475.2, 475.5

(56) References Cited

U.S. PATENT DOCUMENTS

| | | | | |
|---|---|---|---|---|
| 4,410,661 A | * | 10/1983 | Epstein et al. ............... | 138/118 |
| 5,280,066 A | * | 1/1994 | Tekkanat et al. ............ | 525/166 |
| 5,449,552 A | * | 9/1995 | Bochow et al. ............. | 428/323 |
| 5,562,996 A | * | 10/1996 | Kuriu et al. ............. | 428/474.4 |

FOREIGN PATENT DOCUMENTS

| EP | 0974452 A2 | * | 1/2001 | ........... | B32B/27/08 |
|---|---|---|---|---|---|
| WO | 99/55528 | | 11/1999 | | |

OTHER PUBLICATIONS

Kissin, Yury V. "Polyethylene, Linear Low Density." in Kirk–Othmer Encyclopedia of Chemical Technology, 1996.*

* cited by examiner

*Primary Examiner*—James J. Seidleck
*Assistant Examiner*—Travis B Ribar
(74) *Attorney, Agent, or Firm*—Wenderoth, Lind & Ponack, L.L.P.

(57) ABSTRACT

A polyamide resin-based heat-shrinkable multilayer film is caused to satisfy various properties required of a packaging material, especially a food packaging material, at high levels, and particularly exhibit a highest level of heat-shrinkability. The multilayer film comprises at least three layers including an outer surface layer (a) which comprises a polyester resin or a polyolefin resin; an intermediate layer (b) which comprises a mixture of 85–60 wt. % of an aliphatic polyamide resin, and 15–40 wt. % of an aromatic copolyamide resin which is a copolymer of aliphatic diamine/isophthalic acid and aliphatic diamine/terephthalic acid, and an inner surface layer (c) which essentially comprises a copolymer of ethylene and α-olefin having a density below 0.915. The heat-shrinkable multilayer film has been biaxially stretched and then heat-treated to have hot-water shrinkabilities at 80° C. of at least 30% in each of longitudinal/transverse directions and at least 35% in at least one of longitudinal/transverse directions.

14 Claims, 1 Drawing Sheet

HEAT-SHRINKABLE MULTILAYER FILM

FIELD OF THE INVENTION AND RELATED ART

The present invention relates to a heat-shrinkable multilayer film suitable for use as a heat-shrinkable packaging material and comprising at least three layers including an outer surface layer (a) formed of a thermoplastic resin, an intermediate layer (b) formed of a polyamide resin, and an inner surface layer (c) formed of a heat-sealable resin.

Hitherto, it has been widely practiced as a packaging and processing technique for content materials, inclusive of foods such as raw meat, ham and sausage, principally, and other products, to form a casing, such as a bag or a pouch, from a heat-shrinkable multilayer film, and then fill the casing with such a content material, or to automatically package such a content material per se or a tray loaded with such a content material while simultaneously forming a casing from a heat-shrinkable multilayer film.

As heat-shrinkable films for such use, many films comprising a polyamide resin as a principal resin have been proposed heretofore, inclusive of, e.g., a heat-shrinkable polyamide film using a polyamide resin composition comprising an aromatic copolyamide resin which is a copolymer of aliphatic diamine/isophthalic acid and aliphatic diamine/terephthalic acid, and an aliphatic polyamide resin (Japanese Laid-Open Pat. Appl'n (JP-A) 62-41261); and biaxially stretched laminate films or heat-shrinkable multilayer films including an (outer) surface layer comprising a polyester resin, an intermediate layer comprising a polyamide resin and a heat-sealing layer comprising a polyolefin (JP-A 4-99621 corresponding to U.S. Pat. No. 5,336,549, and JP-A 11-300914 corresponding to WO99/55528). These packaging films have succeeded in acquiring respectively intended properties.

However, diversity of properties are required of a packaging film inclusive of, e.g., (a) to (g) described below.

(a) First of all, a packaging film is required to have a strength sufficient to package a content material and provide a skin having a good appearance and allowing a customer to see the content material beautifully therethrough. In order to improve the appearance, it has been widely practiced to heat-shrink the film after packaging the content material. For this purpose, the film should preferably have as large a heat-shrinkability as possible. In this respect, a polyamide resin-based film can be provided with an excellent strength and a large heat-shrinkability through biaxial stretching, and the above-mentioned heat-shrinkable films all have take advantage of such properties of polyamide resin. However, a single layer of polyamide resin cannot satisfy many other properties required of a packaging film.

(b) For Example, a heat-sealing method is adopted in many cases for hermetically sealing a packaging film after packaging the content material, whereas a polyamide resin does not generally have a good heat-sealability. Accordingly, an inner surface layer comprising a heat-sealable resin is disposed on an inner side of the polyamide resin layer.

(c) In case where a moisture-absorptive polyamide resin layer is used to constitute an outer surface layer, the surface layer absorbs water at the time of shrinking with hot water or atmospheric moisture to cause a lowering in strength of the polyamide resin layer when the packaged product is frozen or refrigerated. Particularly, in the case of freezing, the moisture absorbed in the polyamide resin surface layer is frozen to lower the strength thereof. Accordingly, it is preferred to dispose a layer of thermoplastic resin which is moisture-impermeable or has only a small moisture-permeability on an outer side of the polyamide resin layer.

(d) A polyamide resin has a certain degree of gas-barrier property, but it is preferred to dispose a gas-barrier resin layer in addition to the polyamide resin layer for packaging of a content material of which the degradation is extremely undesirable.

(e) The additional layers shown in (b)–(d) above, when used, all function to reduce the good heat-shrinkability after biaxial stretching of a film composed of a single layer polyamide resin.

(f) A film imparted with a heat-shrinkability through biaxial stretching is liable to cause some degree of shrinkage during a period of storage thereafter until its use for packaging or when heated to a temperature of at most 50° C., thus causing wrinkles or size change. This is liable not only to impair the appearance of the product film but also to cause a trouble in an automatic packaging step. For removing these difficulties, a heat treatment (for relaxation or heat-setting) of holding the film after biaxial stretching at a temperature of 60–80° C. is performed, as desired. This heat treatment however also functions to reduce the heat-shrinkability of the film after biaxial stretching.

(g) As a preferred mode of biaxial stretching treatment of a polyamide resin film, an inflation process has been practiced. In the inflation process, only a certain range of inflation gas pressure is commercially feasible and practically used. As a result, in the case of forming various diameters of inflation bubbles, a larger deformation stress is applied for a small diameter bubble (e.g., in lay-flat width of below 400 mm, particularly below 250 mm) and a smaller deformation stress is applied for a larger diameter bubble, respectively to the film section. Accordingly, it is not easy to provide a laminate film structure capable of exhibiting stable inflation performances (capability of forming a stable inflation bubble and acquiring a high heat-shrinkability owing to a biaxial stretching effect of the inflation) for a wide range of bubbles (i.e., a wide range of lay-flat widths) receiving different biaxial stretching stresses.

SUMMARY OF THE INVENTION

Accordingly, a principal object of the present invention is to provide a polyamide resin-based heat-shrinkable multilayer film capable of satisfying the above-mentioned properties (a)–(g) at high levels, and particularly capable of exhibiting a highest level of heat-shrinkability even after heat-setting.

According to our study, it has been found possible to achieve the above-mentioned object by a combination of an intermediate layer (b) comprising a very limited composition of polyamide resin, an outer surface layer (a) comprising a specific composition of thermoplastic resin, an inner surface layer (c) comprising a specific composition of sealable resin, and appropriate biaxial stretching and heat-treating steps.

Based on the above-knowledge, the present invention provides a heat-shrinkable multilayer film, comprising: at least three layers including an outer surface layer (a) formed of a thermoplastic resin, an intermediate layer (b) formed of a polyamide resin, and an inner surface layer (c) formed of a heat-sealable resin; wherein the thermoplastic resin forming the outer surface layer (a) comprises a polyester resin or a polyolefin resin, the polyamide resin forming the intermediate layer (b) comprises a mixture of 85–60 wt. % of an aliphatic polyamide resin, and 15–40 wt. % of an aromatic copolyamide resin which is a copolymer of aliphatic diamine/isophthalic acid and aliphatic diamine/terephthalic acid, the heat-sealable resin forming the inner surface layer (c) essentially comprises a copolymer of ethylene and an α-olefin having a density below 0.915, and the heat-shrinkable multilayer film has been biaxially stretched and then heat-treated to have hot-water shrinkabilities at 80° C. of at least 30% in each of longitudinal/transverse directions and at least 35% in at least one of longitudinal/transverse directions.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE in the drawing is a schematic illustration of an apparatus system suitable for producing a heat-shrinkable multilayer film according to the present invention.

DETAILED DESCRIPTION OF THE INVENTION

The heat-shrinkable multilayer film according to the present invention comprises at least three layers including an outer surface layer (a) formed of a thermoplastic resin, an intermediate layer (b) formed of a polyamide resin, and an inner surface layer (c) formed of a heat-shrinkable resin.

The thermoplastic resin forming the outer surface layer (a) is selected from a polyolefin resin and a polyester resin. The thermoplastic resin is used to provide a thermoplastic resin layer which, in lamination with the intermediate layer (b), shows an appropriate degree of stretchability and obstructs moisture permeation to the intermediate layer (b). As mentioned above, an outer surface layer (a) formed of a polyamide resin can easily develop a hot-water shrinkability, whereas moisture absorbed in the outer surface layer (a) at the time of the hot-water shrinkage is liable to remain thereat to be frozen at the time of freezing or refrigeration, thus causing problems in handling of the packaged product, such as a lowering in strength of the multilayer film.

Preferred examples of the polyolefin resin may include: ethylene-α-olefin copolymers, such as VLDPE (linear very low-density polyethylene) and LLDPE (linear low-density polyethylene); propylene-ethylene copolymer, propylene-ethylene-butene-1 copolymer, EVA (ethylene-vinyl acetate copolymer), EAA (ethylene-acrylic acid copolymer), EMAA (ethylene-methacrylic acid copolymer), EMA (ethylene-methyl methacrylate copolymer), EEA (ethylene-ethyl acrylate copolymer), and EBA (ethylene-butyl acrylate copolymer). For polymerization of these polyolefin resins, known polymerization catalysts, such as conventional catalysts (Ziegler-Natta catalysts) and single-site catalysts (metallocene catalysts), may be used. The comonomer component(s) other than olefin constituting the copolymers may preferably occupy at most 20 wt. % of the resultant α-olefin copolymers. In order to provide an outer surface layer (a) showing a good stretchability, it is particularly preferred to use an ethylene-α-olefin copolymer having a density below 0.915 (g/cm$^3$). The disposition of an outer surface layer (a) comprising a polyolefin resin, particularly a polyolefin resin of an identical species as the one constituting the inner surface layer (c), is advantageous for forming a packaged product having an envelope-type seal structure wherein the outer surface layer (a) is bonded to the inner surface layer (c).

As another class of thermoplastic resin for constituting the outer surface layer (a), a polyester resin (hereinafter sometimes abbreviated as "PET" based on a representative example thereof) may be used. The disposition of an outer surface layer (a) comprising a polyester resin has been considered to make it difficult to impart a high shrinkability with hot water at a relatively low temperature of 80–90° C., but it has been discovered that if such an outer surface layer (a) comprising a polyester resin is combined with an intermediate layer (b) comprising a specific aromatic copolyamide resin, as a characteristic of the present invention, the stretchability thereof is improved to result in a high heat-shrinkability even after heat-setting. A polyolefin resin is excellent in properties, such as transparency, printability and heat-resistance and is a particularly preferred resin for constituting the outer surface layer (a) in the present invention.

The polyester resin forming the outer surface layer (a) may be an aliphatic polyester resin or an aromatic polyester resin.

Any dicarboxylic acid components may be used for synthesizing the polyester resin as far as they can provide a polyester through an ordinary process, including terephthalic acid and isophthalic acid as preferred examples, and also dimers of unsaturated aliphatic acids, and they can also be used in two or more species in combination. Examples of a diol component as another component for synthesizing the polyester resin may include: polyalkylene glycols, such as ethylene glycol, propylene glycol, tetramethylene glycol, neopentyl glycol, hexamethylene glycol, diethylene glycol, poly-ethylene glycol and polytetra methylene oxide glycol; 1,4-cyclohexane-dimethanol, and 2-alkyl-1,3-propanediol.

Among the above, it is preferred to use an aromatic polyester resin comprising an aromatic dicarboxylic acid component, including, e.g., polyesters between terephthalic acid (as a dicarboxylic acid) and diols having at most 10 carbon atoms, such as polyethylene terephthalate and polybutylene terephthalate. Particularly preferred examples thereof may include: copolyesters obtained by replacing a portion, preferably at most 30 mol %, more preferably at most 15 mol %, of the terephalic acid with another dicarboxylic acid, such as isophthalic acid; copolyesters obtained by replacing a portion of the diol component such a ethylene glycol with another diol, such as 1,4-cyclohexanone-dimethanol (e.g., "Kodapak PET #9921", made by Eastman Kodak Co.); and polyester-polyether copolymers comprising the polyester as a predominant component (e.g., polyester-ether between a dicarboxylic acid component principally comprising terephthalic acid or/and its ester derivative and a diol component principally comprising tetramethylene glycol and tetramethylene oxide glycol, preferably containing the polytetra methylene oxide glycol residue in a proportion of 10–15 wt. %). It is also possible to use two or more different polyester resins in mixture.

The polyester resin forming the outer surface layer (a) may preferably have an intrinsic viscosity of 0.6–1.2 (dl/g), e.g., when measured at 20° C. in a solvent mixture of phenol/tetrachloroethane (=6/4 by weight). The outer surface layer (a) can contain a thermoplastic resin other than a polyester resin, such as a thermoplastic elastomer as represented by a thermoplastic polyurethane, within an extent of not adversely affecting the properties of the polyester resin.

The polyamide resin (sometimes abbreviated as "PA") forming the intermediate layer (b) used in the present invention comprises a mixture of 85–60 wt. % an aliphatic polyamide resin, and 15–40 wt. % of an aromatic copolyamide resin which is a copolymer of aliphatic diamine/isophthalic acid and aliphatic diamine/terephalic acid (sometimes called "nylon 6I/6T").

If the aromatic copolyamide resin is below 15 wt. %, it is impossible to attain a high hot-water shrinkability, a characteristic of the multilayer film of the present invention. If the aromatic copolyamide resin exceeds 40 wt. %, the extrudability and stretchability of the multilayer film becomes insufficient. More specifically, for example, the multilayer film becomes brittle and is liable to cause a puncture during inflation or breakage at clipped parts in T-die stretching, thus lowering the productivity.

The aromatic copolyamide resin consisting the intermediate layer (b) in the present invention may preferably be a copolymer formed from an acid component comprising 40–98 mol % of isophthalic acid and 2–60 mol % of terephthalic acid, and aliphatic diamine comprising 50–100 mol % of hexamethylenediamine and 0–50 mol % of bis(p-aminocyclohexyl)methane (as an optional component). Such an aromatic copolyamide resin is generally non-crystalline, or shows only a very little crystallinity, if any, so that its melting point is unclear.

On the other hand, the aliphatic polyamide resin may include an aliphatic polyamide homopolymer and an aliphatic polyamide copolymer. The aliphatic polyamide homopolymer may for example include nylon 6 and nylon 66. Examples of the aliphatic polyamide copolymer may include: nylon 6/66, nylon 6/69, nylon 6/610, nylon 66/610, and nylon 6/12. These aliphatic polyamide resins may be used singly or in mixture of two or more species thereof, e.g., nylon 6 and nylon 6/66, or nylon 6 and nylon 66. The use of an aliphatic polyamide copolymer may easily provide a stably high hot-water shrinkability. Among the above, nylon 6/66 and nylon 6/69 are further preferred because of a good mutual solubility with the aromatic copolyamide resin.

By using the polyamide resin composition comprising a specific ratio of an aliphatic polyamide resin and an aromatic copolyamide resin which is a copolymer of aliphatic diamine/isophthalic acid and aliphatic diamine/terephthalic acid, it becomes possible to obtain a high shrinkability with hot water of 80–90° C.

In contrast thereto, in case where the aliphatic polyamide resin is mixed with an aliphatic polyamide (co-)polymer having a relatively low melting point or another low-crystallinity copolymer of aliphatic polyamide and aromatic polyamide (e.g., a terpolymer among nylon 66, nylon 10 and nylon MXD6), a high heat-shrinkability may be attained if the latter component is incorporated in a higher proportion, but the stretchability is lowered. Particularly, the following difficulties are encountered in biaxial stretching by inflation:

1) the stretching stability is insufficient at a lay-flat width below 250 mm,
2) a high heat-shrinkability cannot be attained at a lay-flat width below 400 mm, and
3) at a large flat width of 400 mm or larger, it become necessary to incorporate a larger proportion of the aliphatic polyamide (co-)polymer having a relatively low melting point or the low crystallinity aliphatic polyamide/aromatic polyamide copolymer. In any case, it becomes impossible to form heat-shrinkable multilayer films having lay-flat widths over a commercially practical range from a single polyamide resin composition so that it becomes necessary to switch between resins depending on the required lever of lay-flat width, thus lowering the productivity uneconomically.

The heat-sealable resin forming the inner surface layer (c) used in the present invention essentially comprises a copolymer of ethylene and α-olefin having a density below 0.915 (g/cm$^3$).

The inner surface layer (c) anyway comprises a heat-shrinkable resin, but a heat-shrinkable resin selected in view of only a sealing strength is liable to fail in providing desired high heat-shrinkability. On the other hand, in addition to a high heat-shrinkability, it is necessary to satisfy a sealing strength and a heat resistance thereof, as required in a state at room temperature after packaging a content material with the multilayer film and at an elevated temperature for heat-shirking the multilayer film and heat-sterilizing the packaged product, respectively. It is necessary that the inner surface layer (c) essentially comprises an ethylene-α-olefin copolymer having a density below 0.915 (g/cm$^3$). Herein, the term "essentially" is used to mean that inner surface layer (c) can comprise a mixture of such an ethylene copolymer as a principal component (of at least 55 wt. %) and another resin as far as the high heat-shrinkability and appropriate seal strength and heat-resistance thereof are satisfied.

If the ethylene-α-olefin copolymer has a density of 0.915 or higher, a desired high heat-shrinkability cannot be obtained. It is preferred that the ethylene-α-olefin copolymer has a density of at most 0.910, and a density of at least 0.890, more preferably at least 0.902, is preferred in view of seal strength and heat-resistance.

The ethylene-α-copolymer may include, e.g., SSC-VLDPE and SSC-LLDPE polymerized in the presence of a single-site catalyst ("SSC") and also conventional types of VLDPE and LLDPE. As mentioned above, such an ethylene-α-olefin copolymer having a density in a range of below 0.915 is used. It is possible to use two or more species in mixture, as desired.

Examples of such another resin usable in mixture with the ethylene-α-olefin copolymer having a density below 0.915 (g/cm$^3$) as the principal resin forming the inner surface layer (c) may include: other ethylene-α-copolymers, EVA, EAA, EMA, EEA and EBA.

Commercially available examples of the ethylene-α-olefin copolymer polymerized in the presence of a single-site catalyst includes: those distributed under the trade names of "EXACT" (made by Exxon Co.), "AFFINITY" and "ELETE" (made by Dow Chemical Co.), "U-MERIT" (made by Ube Kosan K.K.), "EVOLUE" (made by Mitsui Kagaku K.K.), "COLONEL" (made by Nippon Polychem K.K.) and "HARMOLEX" (made by Nippon Polyolefin K.K.).

The multilayer film according to the present invention can optionally include an intermediate layer (d) comprising a gas-barrier resin, examples of which may include: ethylene-vinyl alcohol copolymer (i.e., saponified product of ethylene-vinyl acetate copolymer, "EVOH"), polymetaxylylene adipamide resin ("nylon MXD6"), and aromatic co-polyamide resin which is a copolymer of aliphatic diamine/isophthalic acid and aliphatic diamine/terephthalic acid ("nylon 6I/6T").

Depending on the degrees of gas-barrier property required of various packaging materials, such a gas-barrier resin can be used in a form of mixture. Particularly, nylon MXD6 and nylon 6I/6T may respectively be used in mixtures in order to provide an improved stretchability. The gas-barrier intermediate layer (d) may preferably have a thickness which is lower than, and ca. 70% or less of, that of the intermediate layer (b) comprising a polyamide resin, in view of extrudability and stretchability.

EVOH can easily provide a high heat-shrinkability as required in the present invention if it is mixed with a polyamide resin to form such an intermediate layer (d) of gas-barrier characteristic. In such a case, the polyamide resin is liable to cause crosslinking by reaction with EVOH, thus resulting in a problem in extrudability, so that it is possible to use a polyamide resin subjected to a pretreatment such as inactivation of the terminal functional groups for preventing gelation with EVOH (e.g., "NOVAMID EN-NYLON"made by Mitsubishi Engineering Plastics K.K., and "GRILON CF7" made by EMS Co., as used in Examples hereinafter). Further, the extruder and die may desirably be specially designed in some cases.

An adhesive resin layer may be disposed as an intermediate layer, as desired, e.g., in case where an adhesion between the above-mentioned layers is not sufficient. As such an adhesive resin, it is possible to use an oxygen-containing olefin (co-)polymer. Preferred examples thereof may include: EVA, EEA, EAA, acid-modified polyolefins (inclusive of reaction products between olefin homo- or co-polymers and unsaturated carboxylic acids, such as maleic acid and fumaric acid, acid anhydrides, esters or metal salts of these acids, such as acid-modified VLDPE, acid modified LLDPE and acid-modified EVA). It is particularly suitable to use a polyolefin resin modified with an acid such as maleic acid or an anhydride thereof.

Into any one or more of the above-mentioned layers, it is possible to add an additive, such as a lubricant or an antistatic agent. Preferred examples of lubricants may include behenic acid amide, oleic acid amide and erucic acid amide. These lubricants may preferably be added in the form of a master batch. Such a master batch containing, e.g., 5–20 wt. % of a lubricant, may preferably be added in an amount sufficient to provide a concentration of 0.05–2 wt. % of the lubricant in a resin layer concerned. An anti-static agent, such as a surfactant, may preferably be added in a proportion of 0.05–2 wt. %, more preferably 0.1–1 wt. %, of a resin layer to which it is added.

Preferred examples of layer structure of the heat-shrinkable multilayer film according to the present invention are shown below. These are however not exhaustive.
(1) polyester resin/adhesive resin/polyamide resin/adhesive resin/sealable resin,
(2) polyester resin/adhesive resin/polyamide resin/gas barrier resin/adhesive resin/sealable resin,
(3) polyester resin/adhesive resin/polyamide resin/gas barrier resin/polyamide resin/adhesive resin/sealable resin,
(4) polyolefin resin/adhesive resin/polyamide resin/adhesive resin/sealable resin,
(5) polyolefin resin/adhesive resin/polyamide resin/gas barrier resin/adhesive resin/sealable resin, and
(6) polyolefin resin/adhesive resin/polyamide resin/gas barrier resin/polyamide resin/adhesive resin/sealable resin.

It is also possible to further insert an (oxygen-containing) polyolefin (copolymer) layer between the adhesive layer and the sealable resin layer so as to improve the sealing performance.

The heat-shrinkable multilayer film may preferably be formed by laminating the above-mentioned layers, followed by stretching and heat treatment (relaxation or heat-setting) into a final form of multilayer film having a total thickness of 12–150 μm, particularly 20–100 μm.

More specifically, it is preferred that the outer surface layer (a) comprising a thermoplastic resin has a thickness of 0.5–18 μm, particularly 1–5 μm, the intermediate layer (b) comprising a polyamide resin has a thickness of 3–35 μm, particularly 4–25 μm, and the inner surface layer (c) comprising a sealable resin has a thickness of 10–80 μm, particularly 12–55 μm. Particularly, in the case where the outer surface layer (a) comprises a polyester resin, it is preferred that the layer (a) has a thickness smaller than that of the layer (b), more specifically a thickness of 3–70%, particularly 6–30%, of that of the layer (b), in order to provide the multilayer film with a properly harmonized biaxial stretchability.

The optionally disposed gas-barrier layer (d) may have a thickness of, e.g., 1–30 μm, preferably 2–15 μm. Below 1 μm, the oxygen gas barrier-improving effect may be scarce, and above 30 μm, the extrusion of the layer and the stretching and processing of the multilayer film become difficult.

The adhesive resin layer can be disposed in a plurality of layers, each having a thickness in the range of suitably 0.5–5 μm.

The heat-shrinkable multilayer film may be formed by first forming a yet-unstretched film by co-extrusion through a plurality of extruders and then biaxially stretching the film by a known process, such as the tenter process, followed by a relaxation heat treatment (heat-setting) at a relaxation ratio of at most 15%, more preferably 5–10%, in at least one axial direction. The stretching ratio may preferably be at least 2.6 times, particularly 2.8–3.5 times, in both longitudinal and transverse directions. The thus-formed stretch-oriented multilayer film can also be laminated with another resin layer according to a known lamination process.

Figure 1:
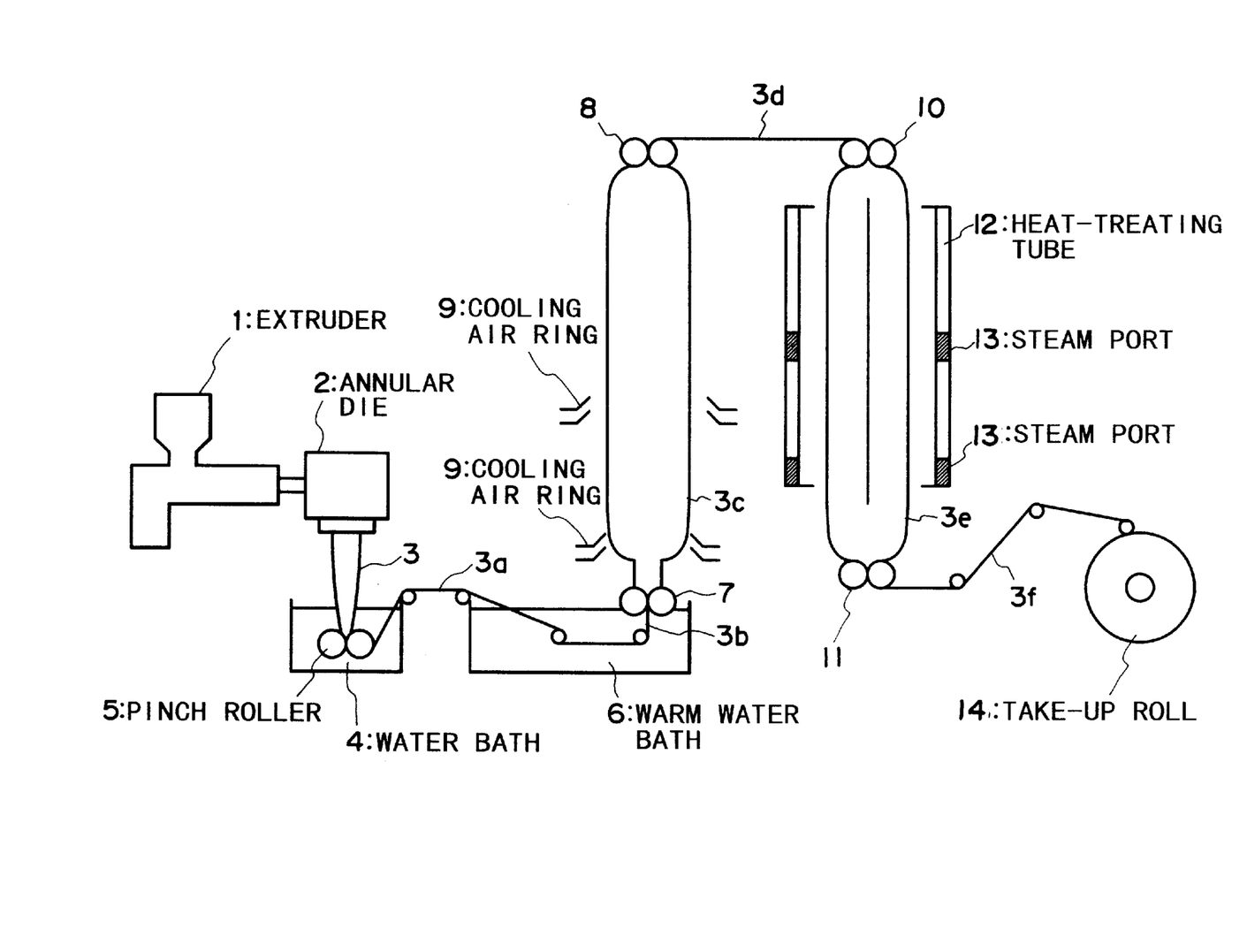

The heat-shrinkable multilayer film may preferably be formed through the inflation process. A preferred embodiment thereof is described with reference to the sole figure in the drawing.

A number of extruders 1 (only one being shown) are provided corresponding to the number of laminated resin species, and the respective resins from the extruders are co-extruded through an annular die 2 to form a tubular melted resin product (parison) 3 including at least three layers of an outer surface layer (a) comprising a thermoplastic resin, an intermediate layer (b) comprising a polyamide resin and an inner surface layer (c) comprising a sealable resin. The parison 3 is then vertically pulled down into a water bath 4 and taken up by pinch rollers 5 while being cooled down to a temperature that is below the lowest one of the melting points of the principal resins constituting the respective resin layers (i.e., the thermoplastic resin, the polyamide resin and the sealable resin), preferably to at most 20° C., more preferably 15° C. or below. The thus-taken-up tubular film 3a, while optionally introducing an opening aid, such as soybean oil, fatty acid ester of glycerin or propylene glycol, thereinto as desired, is introduced into a bath 6 of warm water at, e.g., 80–95° C., which is at most the lowest one of the meting points of the principal resins constituting the respective layers, and the thus-warmed tubular film 3b is pulled upwards to form a bubble of tubular film 3c with fluid air introduced between pairs of pinch rollers 7 and 8, whereby the tubular film 3C is biaxially stretched simultaneously at a ratio of preferably 2.5–4 times, more preferably 2.6–3.5 times, most preferably 2.8–3.5 times in each of vertical or machine direction (MD) and transverse or lateral direction (TD), while cooling the film 3c with cool air at 10–20° C. from a cooling air ring 9. The thus biaxially stretched film 3d is once folded or laid flat and then pulled downwards to again form a bubble of tubular film 3e with fluid air introduced between pairs of pinch rollers 10 and 11. The bubble of tubular film 3e is held within a heat-treating tube 12 wherein steam alone or together with air is blown from blowing ports 13 against the tubular film 3e to heat-treat the tubular film 3e after the biaxial stretching at 60–80° C., preferably 65–75° C., for ca. 1–20 sec., preferably ca. 1.5–10 sec., thereby allowing the tubular film to relax by 5–15%, preferably 5–10%, in each of the machine direction (MD) and the transverse direction (TD). A tubular film 3f after the heat-treatment corresponds to a heat-shrinkable multilayer film according to the present invention and is wound about a take-up or winding roller 14.

Again to say, in order to realize improvements in various properties as represented by a high heat-shrinkability, it is extremely preferred to adopt a combination of high degree of stretching and relaxation heat-treatment, i.e., to ensure high stretching ratios of 2.5–4 times, more preferably 2.6–3.5 times, most preferably 2.8–3.5 times, in both MD/TD, and then to effect a heat-treatment for causing relaxation by 5–15% in each of MD/TD, preferably by 5–10% in each of MD/TD, with steam having a large heat capacity, alone or together with air. At a lower stretching ratio, it is difficult to attain a necessary heat-shrinkability after the heat treatment, and the resultant film is liable to have thickness irregularity, thus failing to exhibit satisfactory packaging performance. Thus, it is possible to obtained a heat-shrinkable multilayer film exhibiting a high heat-shrinkability even after the heat treatment. The heat treatment is performed in order to provide an attractive appearance to the film after the stretching by suppressing the occurrence of wrinkles due to minor size changes, thereby providing a heat-shrinkable multilayer film having excellent size stability adapted to secondary processing, such as automatic packaging or bag making. It is possible to use warm water for the heat treatment in some cases.

As a result of the heat treatment, the heat-shrinkable multilayer film according to the present invention is obtained as a film having good size stability as represented by a size change ratio (shrinkability, after standing for two weeks in an environment of 23° C. and 50% relative humidity) of generally at most 5%, preferably at most 3%, particularly preferably at most 2%, in each of MD/TD, thus being provided as a substantially wrinkle-free film suitable for heat-shrink packaging use.

The heat-shrinkable multilayer film according to the present invention is used in the filed requiring packaging materials having a particularly high heat-shrinkability, such as chilled packaging of raw meats of beef, pork, etc.; pillow packaging (or flow packaging); packaging of processed meat; packaging of highly smoked foods as represented by hard bacon; cheese packaging; packaging of food such as terrine contained in a ceramic jar; packaging of foods having projections such as rib (meat), lobsters, prawns, and crabs; packaging of fish meat and other marine products; and freeze-packaging of raw meat of beef, pork, poultry and fishes. So as to be adapted to a use requiring a wide applicable temperature range, the film of the present invention is provided with a hot-water shrinkability at 80° C. of at least 30% in each of MD/TD directions and at least 35% in at least one of the MD/TD directions, and preferably a hot-water shrinkability at 90° C. of at least 40% in at least one direction. In the case of packaging a large-size content material, the multilayer film is subjected to different rates of temperature rise between a part contacting the content material and a part not contacting the content material, so tat it is preferred for the multilayer film to satisfy desirable heat-shrinkabilities at two temperatures of 80° C. and 90° C.

In the above-described stretch-oriented multilayer film production process, the multilayer film before or after the stretching may be exposed to radiation according to a known manner. By the exposure to radiation, the product multilayer film may be provided with improved heat resistance and mechanical strength. Because of a moderate crosslinking effect thereof, the exposure to radiation can exhibit an effect of providing improved film formability by stretching and improved heat resistance. In the present invention, electron beams are particularly preferred as a type of radiation in view of facility of handling and high processing capacity in producing the objective multilayer film.

The conditions for the above exposure to radiation may be appropriately set depending on the purpose thereof, such as a required level of crosslinkage. For example, it is preferred to effect the electron beam exposure at an acceleration voltage in the range of 150–500 kilo-volts to provide an absorbed dose of 10–200 kGy (kilo-gray).

It is also possible that the inner surface or/and the outer surface of the heat-shrinkable multilayer film of the present invention are subjected to corona discharge treatment, plasma treatment or flame treatment. It is particularly appropriate to apply the corona discharge treatment to the inner surface in order to provide an improved meat-adhesion characteristic. For this purpose, it is preferred to provide the inner surface with a wet surface tension of at least 32 dyn/cm, more preferably 34 dyn/cm or higher.

EXAMPLES

Hereinbelow, the present invention will be described more specifically based on Examples and Comparative Examples. It should be noted however that the scope of the present invention is not restricted by such Examples. Some physical properties described herein are based on values measured according to the following methods.

<Physical Property Measurement Methods>
1. Hot-Water Shrinkability

A sample film on which marks are indicated at a distance therebetween of 10 cm in each of a machine direction (MD) and a transverse direction (TD) perpendicular to the machine direction, is dipped for 10 sec. in hot water adjusted at 80° C. or 90° C. and then taken out therefrom, followed by immediate quenching within water at room temperature. Thereafter, the distance between the marks is measured and a decrease in distance is indicated in percentage of the original distance 10 cm. Five sample films from each product film are subjected to the above measurement, and the average value of percentage decrease is indicated in each of the MD and TD.

2. Dry Heat-Shrinkability

A 3 mm-thick corrugated board is placed on a rack, and a Geer oven ("Model MOG-600", available from K. K. Robert) is placed thereon and heated to a 160° C. Into the oven, a sample film on which marks are indicated at a distance therebetween of 10 cm in each of MD and TD is placed. In this instance, the door of the oven is immediately closed after the placement of the sample film so that the door opening period is restricted to be within 3 seconds. After the door closure, the sample film is left standing for 30 sec. in the Geer oven and then taken out for natural cooling. Thereafter, the distance between the marks on the sample film is measured, and a decrease in distance is indicated in percentage of the original distance 10 cm. Five sample films from each product film are subjected to the above measurement, and the average value of percentage decrease is indicated in each of the MD and TD.

3. Size Change (Room Temperature Shrinkability)

A sample film immediately after the production is provide with marks at a distance therebetween of 10 cm in each of MD and TD and is left to stand for 2 weeks in an environment of 23° C. and 50% RH. Thereafter, the distance between the marks on the sample film is measured, and a decrease in distance is indicated in percentage of the original distance 10 cm. Five sample films from each product film are subjected to the above measurement, and the average value of percentage decrease is indicated in each of the MD and TD.

<Film Production Examples>

Next, Examples and Comparative Examples for production of heat-shrinkable multilayer films are described. Resins and additives used in the following productions examples are inclusively shown in Tables 1 and 2 together with their abbreviations.

Example 1

By using an apparatus having an arrangement as roughly shown in the sole figure, a tubular laminate product (parison) having a laminar structure from the outer to the inner layers of PET+LUB-1=98+2 wt. % mixture (2)/M-PE (1.5)/NY-1+ NY-3=80+20 wt. % mixture (8)/EVOH (5)/M-PE (1.5)/ VLDPE-1+LUB-2=9+3 wt. % mixture (21) with thickness ratios of respective layers indicated in the parentheses was co-extruded by extruding the respective resins through a plurality of extruders 1 (only one being shown) respectively and introducing the melted resins to an annular die 2 to melt-bond the respective layers in the above-described order. The molten parison 3 extruded out of the die 2 was quenched to ca. 16° C. by a water bath 4 to form a flat tubular product 3a having a lay-flat width of 129 mm. Then, the flat tubular product 3a was passed through a warm water bath 6 at 86° C. and formed into a bubble-shaped tubular film 3c, which was then biaxially stretched at ratios of 2.9 times in MD and 3.1 times in TD by the inflation process while being cooled with cooling air at 15–20° C. from an air ring 9. Then, the biaxially stretched film 3d was guided into a 2 meter-long heat-treating tube 12 to form a bubble-shaped tubular film 3e, which was then heat-treated for 2 sec. with steam at 70° C. blown out of steam blowing ports 13, while being allowed to relax by 10% in MD direction and by 10% in TD direction, thereby providing a biaxially stretched film (stretch-oriented multilayer film) 3f. The thus-obtained multilayer film exhibited a lay-flat width of 362 mm and a thickness of 39 μm.

The laminate structure, and film production (stretching-relaxation) conditions of the thus-obtained multilayer film are inclusively shown in Tables 3 and 4 together with those of multilayer films obtained in other Examples and Comparative Examples.

Examples 2–12 and Comparative Examples 1–7

Various biaxially stretched films (heat-shrinkable multilayer films) were prepared in similar manners as in Example 1 except that the laminar structures and film production (stretching conditions were respectively changed as shown in Tables 3 and 4.

The lay-flat widths were 256 mm (Examples 2 and 12), 515 mm (Example 6), 576 mm (Example 7), 206 mm (Examples 10 and 11), 256 mm (Comparative Examples 1 and 2), 450 mm (Comparative Example 3), 325 mm (Comparative Example 5), 576 mm (Comparative Example 7), 325 mm (Comparative Example 8), 256 mm (Comparative Example 9), and generally 362 mm (in other Examples).

In Comparative Example 4, the resultant multilayer film exhibited a lay-flat width of 360 mm as an average value but the lay-flat width was fluctuated in a range of 345–380 mm due to severe stretching irregularity. Moreover, the puncture of the inflation bubble was caused several times, and the film was judged to lack in commercial productivity.

In Comparative Example 3, possible stretching ratios were at most 2.3 times in both MD and TD directions, and a higher ratio of stretching was impossible, so that the relaxation heat treatment thereafter was not performed.

Comparative Example 10

The production of a biaxially stretched multilayer film was tried in the same manner as in Example 1 except for using NY-3 alone instead of the 80:20 wt. % mixture of NY-1 and NY-3. As a result, no inflation bubble was formed, and the film production was impossible at all.

<Performance Evaluation>

Each of the heat-shrinkable multilayer films prepared in the above Examples and Comparative Examples was subjected to measurement of the hot-water shrinkability, dry heat-shrinkability and size change ratio (room temperature shrinkability) in the above-described manners, and some of the sample films were subjected to packaging performance tests described below. Incidentally, the multilayer films of Examples 1–4, 6–8 and 10–12 each having an outer surface layer of a polyester resin (PET) exhibited remarkably better gloss compared with the multilayer films of Examples 5 and 9 having an outer surface layer of a polyolefin resin.

Pillow Packaging Test

Both side edge portions (pinch lines) of a product tubular film were slit off to leave flat film samples each having a width of 320 mm. Polystyrene-made trays each having a shape of semi-circle (having a diameter of 190 mm and an additional rectangular portion (of 25 mm in width and a length of 190 mm) adjacent to the diameter) were automatically subjected to pillow packaging with the flat film sample at a rate of 35 shots/min. by using a pillow packaging machine ("CEP 3000", made by Ibaraki Seiki K.K.) so as to provide packaged (wrapped) samples each having a peripheral length of 290 mm and a cut length of 220 mm. Then, the samples were introduced into a shrink tunnel (made by K & U System K.K.) where hot air heated to 170° C. was blown against each sample for 5 sec. to cause a shrinkage of the film. The appearance of the thus packaged product was observed and evaluated according to the following standard.

A: When the semicircular tray is observed from a position right above it, no marginal portion of the film (dog ear) is hardly recognized, and the appearance is beautiful.

C: When the semicircular tray is observed from a position right above it, much marginal portion of the film (dog ear) is left, thus lowering the merchandise value.

Raw Meat Packaging Test

One end of a sample film having a lay-flat width of 256 mm or 362 mm and cut in a length of 700 mm was round bottom-sealed to form a bag. The bag was filled with ca. 5–7 kg of thigh meat and then subjected to 1 sec of shrinkage with hot water of 83–85° C. The appearance of the thus-packaged product was observed with respect to the sufficiency of shrinkage at upper and lower edges (i.e., the presence or absence of gap causing gravy stagnation) and the expansion or tension state of the filled part of the packaged product, and evaluation was performed according to the following standard.

A: The shrinkage at the edges is sufficient, and the packaged product shows a good expansion or tension state.
B: The shrinkage at the edges is slightly insufficient, and the packaged product shows a somewhat inferior expansion or tension state.
C: The shrinkage at the edges is insufficient, and the packaged product shows a shortage of expansion or tension.

Incidentally, the multilayer film of Example 7 was subjected to a test for evaluating flow-packaging performance (similar to the above-mentioned pillow-packaging performance).

More specifically, a tubular film sample was slit to provide a flat film sample, which was set on a flow packaging machine. Then, transparent trays loaded with cut raw meat were subjected to aeration with a gaseous mixture of carbon dioxide and nitrogen and then over-wrapped with the film, followed by heat-sealing at prescribed parts and passing through a hot air tunnel at 160° C. in 3 sec. to provide packaged products. Each packaged product exhibited a tight packaged state without excess or shortage of shrinkage of the film, and thus an excellent appearance. Some packaged products were stored for 24 hours in a refrigeration chamber to observe an anti-fogging effect. As a result, some water droplets were attached to the film surface, but the contents were clearly recognized therethrough, thus showing a sufficient anti-fogging effect.

TABLE 1

Resins and Additives

| Abbreviation | Resin | Maker (Trade name) | Crystal melting point (° C.) | Remarks ** |
|---|---|---|---|---|
| NY-1 | nylon 6–66 copolymer (wt. ratio = 80:20) | Ube Kosan K.K. (UBE NYLON 5034B) | 195 | $\eta_{rel}$ = 4.5 |
| NY-2 | nylon 6–66 copolymer (wt. ratio = 80:20) | Mitsubishi Engineering Plastic K.K. (NOVAMID 2430A1) | 193 | $\eta_{rel}$ = 4.4 |
| NY-3 | amorphous nylon (nylon 6I/6T copolymer) (d = 1.18 g/cm$^3$) | EMS Co. (GRIVORY G21) | none | Tg = 125° C. |
| NY-4 | amorphous nylon (nylon 6I/6T copolymer) (d = 1.19 g/cm$^3$) | Du Pont (SELAR PA3426) | none | Tg = 127° C. |
| NY-5 | amorphous nylon (nylon 6I/6T copolymer) (d = 1.18 g/cm$^3$) | Mitsubishi Engineering Plastic K.K. (NOVAMID X21) | none | Tg = 125° C. |
| NY-6 | nylon 6–12 copolymer (EVOH modifier) | EMS Co. (GRILON CF7) | 155 | |
| NY-7 | nylon 66-610-MXD6 copolymer | EMS Co. (GRILON BM-18SBH) | 181 | |
| PET | ethylene terephthalate-isophthalate copolymer *1 | Kanebo K.K. (BELPET IFG-8L) | 228 | $\eta_{int}$ = 0.80 |
| EVOH | saponified ethylene-vinyl acetate copolymer (ethylene content = 48 mol %) | Kuraray K.K. (EVAL EPG156B) | 160 | MFR = 6.5 g/10 min. |

*1: Acid is a mixture of 12 mol % isophthalic acid and 88 mol % terephthalic acid.
**: $\eta_{rel}$ = relative viscosity, $\eta_{int}$ = intrinsic viscosity, MFR = melt flow rate.

TABLE 2

Resins and Additives

| Abbreviation | Resin or Additive | Maker (Trade name) | Crystal melting point (° C.) | Remarks ** |
|---|---|---|---|---|
| VLDPE-1 | ethylene-octene copolymer (d = 0.904 g/cm$^3$) | Dow Chemical Co. (ATTANE SC4107) | 122 | MFR = 4.0 g/10 min |
| VLDPE-2 | ethylene-hexene copolymer (d = 0.908 g/cm$^3$) | Sumitomo Kagaku K. K. (SMIKASEN CS3009) | 119 | MFR = 3.0 g/10 min |
| SSC-VL | ethylene-octene copolymer *2 (d = 0.902 g/cm$^3$) | Exxon Co. (Exact0203) | 95 | MFR = 3.0 g/10 min |
| LLDPE | ethylene-octene copolymer (d = 0.916 g/cm$^3$) | Idemitsu Sekiyu Kagaku K. K. (MORETEC 0238CN) | 122 | MFR = 2.0 g/10 min |
| M-PE | modified very low density polyethylene *3 | Mitsui Kagaku K. K. (ADMER SF730) | — | MFR = 2.7 g/10 min |
| LUB-1 | Lubricant master batch *4 | Nippon Pigment K. K. (NIPPISUN COLOUR MB60) | | |
| LUB-2 | Lubricant master batch *5 | CIBA Geigy (MB OR 021) | — | |
| AF-1 | Anti-fogging master batch *6 | Riken Vitamin K. K. (KP-790) | | |

**: The same as in TABLE 1.
*2: Polymerized in the presence of a metallocene catalyst.
*3: Modified with an unsaturated carboxylic acid.
*4: PET(base resin) + silica 2.5 wt %.

TABLE 2-continued

Resins and Additives

| Abbreviation | Resin or Additive | Maker (Trade name) | Crystal melting point (° C.) | Remarks ** |
|---|---|---|---|---|

*5: LDPE(base resin) + silica 4 wt % + erucic acid amide 2 wt %.

*6: LDPE(base resin) + sorbitan laurate / higher alcohol ethylene oxide ether mixture 10 wt %.

TABLE 3

Layer structure and Process conditions

| Example | Layer structure and materials (μm) | | | | | | Stretching Temp (° C.) | Stretching ratios MD/TD | Relaxation Temp (° C.) | Relaxation MD/TD (%) | Lay-flat width (mm) |
|---|---|---|---|---|---|---|---|---|---|---|---|
| | 1st | 2nd | 3rd | 4th | 5th | 6th | | | | | |
| 1 | PET + LUB-1 = 98 + 2 wt %. (2) | M-PE (1.5) | NY-1 + NY-3 = 80 + 20 wt %. (8) | EVOH (5) | M-PE (1.5) | VLDPE-1 + LUB-2 = 97 + 3 wt %. (21) | 86 | 2.9/3.1 | 70 | 10/10 | Ca. 362 |
| 2 | PET + LUB-1 = 98 + 2 wt %. (2) | M-PE (1.5) | NY-2 + NY-3 = 80 + 20 wt %. (8) | EVOH (5) | M-PE (1.5) | VLDPE-2 (21) | 86 | 2.8/3.1 | 65 | 5/5 | Ca. 256 |
| 3 | PET + LUB-1 = 98 + 2 wt %. (2) | M-PE (1.5) | NY-1 + NY-4 = 80 + 20 wt %. (8) | EVOH (5) | M-PE (1.5) | VLDPE-1 + LUB-2 = 97 + 3 wt %. (21) | 86 | 2.9/3.2 | 75 | 10/5 | Ca. 362 |
| 4 | PET + LUB-1 = 98 + 2 wt %. (2) | M-PE (1.5) | NY-1 + NY-3 = 80 + 20 wt %. (8) | EVOH (5) | M-PE (1.5) | SSC-VL + LUB-2 = 97 + 3 wt %. (21) | 86 | 2.9/3.1 | 70 | 10/10 | Ca. 362 |
| 5 | SSC-VL (2) | M-PE (1.5) | NY-1 + NY-5 = 80 + 20 wt %. (8) | EVOH (5) | M-PE (1.5) | VLDPE-1 + LUB-2 = 97 + 3 wt %. (21) | 86 | 2.9/3.1 | 70 | 10/10 | Ca. 362 |
| 6 | PET (2) | M-PE (1.5) | NY-1 + NY-3 = 80 + 20 wt %. (8) | EVOH + NY-6 = 75 + 25 wt %. (5) | M-PE (1.5) | VLDPE-1 + AF-1 = 90 + 10 wt %. (21) | 86 | 3.0/3.3 | 70 | 10/10 | Ca. 515 |
| 7 | PET (1) | M-PE (1) | NY-1 + NY-3 = 80 + 20 wt %. (5) | EVOH (3) | M-PE (1) | VLDPE-1 + AF-1 = 90 + 10 wt %. (13) | 86 | 3.1/3.2 | 70 | 10/10 | Ca. 576 |
| 8 | PET + LUB-1 = 98 + 2 wt %. (2) | M-PE (1.5) | NY-1 + NY-3 = 70 + 30 wt %. (8) | EVOH (5) | M-PE (1.5) | VLDPE-1 + LUB-2 = 97 + 3 wt %. (21) | 86 | 2.9/3.1 | 70 | 10/10 | Ca. 362 |
| 9 | VLDPE-1 (2) | M-PE (1.5) | NY-1 + NY-3 = 60 + 40 wt %. (8) | EVOH (5) | M-PE (1.5) | VLDPE-1 + LUB-2 = 97 + 3 wt %. (21) | 86 | 2.9/3.1 | 70 | 10/10 | Ca. 362 |
| 10 | PET + LUB-1 = 98 + 2 wt %. (2) | M-PE (1.5) | NY-2 + NY-3 = 80 + 20 wt %. (11) | EVOH (4) | M-PE (1.5) | VLDPE-1 + LUB-2 = 97 + 3 wt %. (19) | 86 | 2.9/3.1 | 70 | 10/10 | Ca. 362 |
| 11 | PET + LUB-1 = 98 + 2 wt %. (2) | M-PE (1.5) | NY-2 + NY-3 = 80 + 20 wt %. (11) | EVOH (4) | M-PE (1.5) | VLDPE-1 + LUB-2 = 97 + 3 wt %. (19) | 86 | 2.9/3.1 | 70 | 15/10 | Ca. 362 |
| 12 | PET + LUB-1 = 98 + 2 wt %. (3) | M-PE (1.5) | NY-2 + NY-3 = 80 + 20 wt %. (23) | EVOH (3) | M-PE (1.5) | VLDPE-1 + LUB-2 = 97 + 3 wt %. (58) | 86 | 2.8/3.1 | 70 | 10/10 | Ca. 362 |

TABLE 4

Layer structure and Process conditions

| Example | Layer structure and materials (μm) | | | | | | Stretching Temp (° C.) | Stretching ratios MD/TD | Relaxation Temp (° C.) | Relaxation MD/TD (%) | Lay-flat width (mm) |
|---|---|---|---|---|---|---|---|---|---|---|---|
| | 1st | 2nd | 3rd | 4th | 5th | 6th | | | | | |
| Comp. 1 | PET + LUB-1 = 98 + 2 wt %. (2) | M-PE (1.5) | NY-2 (8) | EVOH (5) | M-PE (1.5) | VLDPE-2 + LUB-2 = 97 + 3 wt %. (21) | 86 | 2.8/3.1 | 65 | 5/5 | Ca. 256 |
| Comp. 2 | PET + LUB-1 = 98 + 2 wt %. (2) | M-PE (1.5) | NY-2 + NY-3 = 80 + 20 wt %. (8) | EVOH (5) | M-PE (1.5) | LLDPE (21) | 86 | 2.8/3.1 | 65 | 5/5 | Ca. 256 |
| Comp. 3 | PET + LUB-1 = 98 + 2 wt %. (2) | M-PE (1.5) | NY-1 + NY-4 = 50 + 50 wt %. (8) | EVOH (5) | M-PE (1.5) | VLDPE-2 + LUB-2 = 97 + 3 wt %. (21) | 95 | 2.3/2.3 | none | none | Ca. 450 |

TABLE 4-continued

Layer structure and Process conditions

| Example | Layer structure and materials (μm) | | | | | | Stretching Temp (°C.) | Stretching ratios MD/TD | Relaxation Temp (°C.) | Relaxation MD/TD (%) | Lay-flat width (mm) |
|---|---|---|---|---|---|---|---|---|---|---|---|
| | 1st | 2nd | 3rd | 4th | 5th | 6th | | | | | |
| Comp. 4 | PET + LUB-1 = 98 + 2 wt %. (2) | M-PE (1.5) | NY-1 + NY-7 = 60 + 40 wt %. (8) | EVOH (5) | M-PE (1.5) | VLDPE-1 + LUB-2 = 97 + 3 wt %. (21) | 86 | 3.0/3.3 | 70 | 10/10 | Ca. 345 |
| Comp. 5 | PET (2) | M-PE (1.5) | NY-1 + NY-7 = 60 + 40 wt %. (8) | EVOH (5) | M-PE (1.5) | VLDPE-2 (21) | 86 | 2.9/3.5 | 70 | 5.5 | Ca. 325 |
| Comp. 6 | VLDPE-1 (2) | M-PE (1.5) | NY-1 + NY-3 = 90 + 10 wt %. (8) | EVOH (5) | M-PE (1.5) | VLDPE-1 + LUB-2 = 97 + 3 wt %. (21) | 86 | 2.9/3.1 | 70 | 10/10 | Ca. 362 |
| Comp. 7 | PET (1) | M-PE (1) | NY-1 (5) | EVOH (3) | M-PE (1) | VLDPE-1 + AF-1 = 90 + 10 wt %. (13) | 86 | 3.1/3.2 | 70 | 10/10 | Ca. 576 |
| Comp. 8 | PET (2) | M-PE (1.5) | NY-1 + NY-7 = 70 + 30 wt %. (8) | EVOH (5) | M-PE (1.5) | VLDPE-2 (21) | 86 | 2.9/3.5 | 70 | 5/5 | Ca. 325 |
| Comp. 9 | PET (2) | M-PE (1.5) | NY-1 + NY-7 = 70 + 30 wt %. (8) | EVOH (5) | M-PE (1.5) | VLDPE-2 (21) | 86 | 2.9/3.5 | 70 | 5/5 | Ca. 256 |

TABLE 5

Film performances

| Example | 1 | 2 | 3 | 4 | 5 | 6 | 7 | 8 | 9 | 10 | 11 | 12 |
|---|---|---|---|---|---|---|---|---|---|---|---|---|
| Hot-water shrinkability (%) | | | | | | | | | | | | |
| 80° C. | 32/38 | 31/35 | 31/37 | 35/39 | 32/38 | 41/42 | 34/38 | 35/40 | 36/42 | 32/36 | 30/35 | 31/36 |
| 90° C. MD/TD | 38/43 | 38/42 | 37/43 | 39/43 | 38/42 | 45/45 | 40/43 | 40/46 | 42/48 | 38/42 | 36/42 | 38/43 |
| Dry heat-shrinkability (%) 160° C. MD/TD | 35/40 | 36/39 | 35/41 | 36/40 | 35/39 | 44/43 | 36/42 | 38/43 | 40/45 | 36/40 | 34/39 | 36/39 |
| Size change (23° C., 2 weeks) MD/TD (%) | 0/1 | 2/3 | 2/2 | 0/1 | 0/1 | 0/1 | 0/1 | 0/1 | 0/1 | 0/1 | 0/1 | 0/1 |
| Raw-meat packaging | | | | | | | | | | | | |
| Shrink at edges | A | A | A | A | A | A | — | A | A | A | A | A |
| Expansion of package | A | A | A | A | A | A | — | A | A | A | A | A |
| Pillow Packaging | — | — | — | — | — | — | A | — | — | — | — | — |
| Lay-flat width (ca, mm) | 362 | 256 | 362 | 362 | 362 | 515 | 576 | 362 | 362 | 206 | 206 | 256 |

TABLE 6

Film performances

| Example | Comp. 1 | Comp. 2 | Comp. 3 | Comp. 4 | Comp. 5 | Comp. 6 | Comp. 7 | Comp. 8 | Comp. 9 |
|---|---|---|---|---|---|---|---|---|---|
| Hot-water shrinkability (%) | | | | | | | | | |
| 80° C. | 29/30 | 23/26 | 22/24 | — | 29/37 | 31/33 | 23/26 | 28/34 | — |
| 90° C. MD/TD | 32/33 | 29/33 | 27/30 | — | 36/43 | 35/38 | 32/31 | 35/40 | — |
| Dry heat-shrinkability (%) 160° C. MD/TD | 30/33 | 29/31 | 28/32 | — | — | 33/35 | 23/26 | — | — |
| Size change (23° C., 2 weeks) MD/TD (%) | 2/3 | 2/3 | 7/8 | — | — | 0/1 | 0/1 | — | — |
| Raw-meat packaging | | | | | | | | | |
| Shrink at edges | C | C | C | — | — | B | — | — | — |
| Expansion of package | C | C | C | — | — | B | — | — | — |
| Pillow Packaging | — | — | — | — | — | — | C | — | — |
| Lay-flat width (ca, mm) | 256 | 256 | 450 | 345–380 | 325 | 362 | 576 | 225 | 256 |
| Remarks | | | | stretch impossible | stretch difficult | | | stretch difficult | stretch impossible |

As described above, according to the present invention, there is provided a polyamide resin-based heat-shrinkable multilayer film comprising an intermediate layer (b) comprising a very limited composition of polyamide resin, an outer surface layer (a) comprising a specific thermoplastic resin and an inner surface layer (c) comprising a specific sealable resin in combination with appropriate biaxial stretching treatment and relaxation heat treatment. As a result, the product multilayer film satisfies various properties required of a packaging film, particularly a food packaging film, at the utmost level, and particularly a highest level of heat-shrinkability even after a relaxation heat treatment.

What is claimed is:

1. A heat-shrinkable multilayer film, comprising: at least three layers including an outer surface layer (a) formed of a thermoplastic resin, an intermediate layer (b) formed of a polyamide resin, and an inner surface layer (c) formed of a heat-sealable resin; wherein the thermoplastic resin forming the outer surface layer (a) comprises a polyester resin or a polyolefin resin, the polyamide resin forming the intermediate layer (b) comprises a mixture of 85–60 wt. % of an aliphatic polyamide resin, and 15–40 wt. % of an aromatic copolyamide resin which is a copolymer of aliphatic diamine/isophthalic acid and aliphatic diamine/terephthalic acid, the heat-sealable resin forming the inner surface layer (c) essentially comprises a copolymer of ethylene and an α-olefin, the copolymer having a density below 0.915, the heat-shrinkable multilayer film has been biaxially stretched and then heat-treated to have hot-water shrinkabilities of at least 30% in each of longitudinal/transverse directions and at least 35% in at least one of longitudinal/transverse directions, as measured after dipping the multilayer film in water at 80° C. for 10 seconds, and the heat-shrinkable multilayer film has a characteristic of size change of at most 5% in both of longitudinal/transverse directions after standing for 2 weeks in an environment of 23° C. and 50%-relative humidity.

2. A multilayer film according to claim 1, wherein the inner surface layer (c) essentially comprises a copolymer of ethylene and an α-olefin, the copolymer having a density below 0.910.

3. A multilayer film according to claim 1, wherein the inner surface layer (c) has a thickness of at least 12 μm.

4. A multilayer film according to claim 1, wherein the multilayer film has a dry heat-shrinkability at 160° C. of at least 35% in at least one direction.

5. A multilayer film according to claim 1, wherein the multilayer film has a hot-water shrinkability at 90° C. of at least 40% in at least one direction.

6. A multilayer film according to claim 1, wherein the multilayer film has a characteristic of size change of at most 3% in both of longitudinal/transverse directions after standing for 2 weeks in an environment of 23° C. and 50%-relative humidity.

7. A multilayer film according to claim 1, wherein the aromatic copolyamide resin in the intermediate layer (b) comprises a copolymer of an acid component comprising 40–98 mol % of isophthalic acid and 2–60 mol % of terephthalic acid and a diamine component comprising 50–100 mol % of hexamethylene-diamine and 0–50 mol % of bis(p-amino-cyclohexyl)methane.

8. A multilayer film according to claim 1, wherein the aliphatic polyamide resin in the intermediate layer (b) is an aliphatic polyamide copolymer.

9. A multilayer film according to claim 1, wherein the multilayer film is tubular in form.

10. A multilayer film according to claim 9, wherein the multilayer film has a lay-flat width below 400 mm.

11. A multilayer film according to claim 1, wherein the outer surface layer (a) comprises a polyester resin.

12. A multilayer film according to claim 1, wherein the multilayer film further includes an intermediate layer (d) comprising a gas-barrier resin.

13. A multilayer film according to claim 12, wherein the gas-barrier resin comprises ethylene-vinyl alcohol copolymer.

14. A multilayer film according to claim 12, wherein the gas-barrier resin comprises a mixture of ethylene-vinyl alcohol copolymer and a polyamide resin.

* * * * *